Sept. 1, 1931.  E. A. BANSCHBACH  1,821,284
BUFFER
Original Filed April 17, 1922   5 Sheets-Sheet 1

Inventor,
Edward A. Banschbach,
By Kent W. Wonnell
Atty.

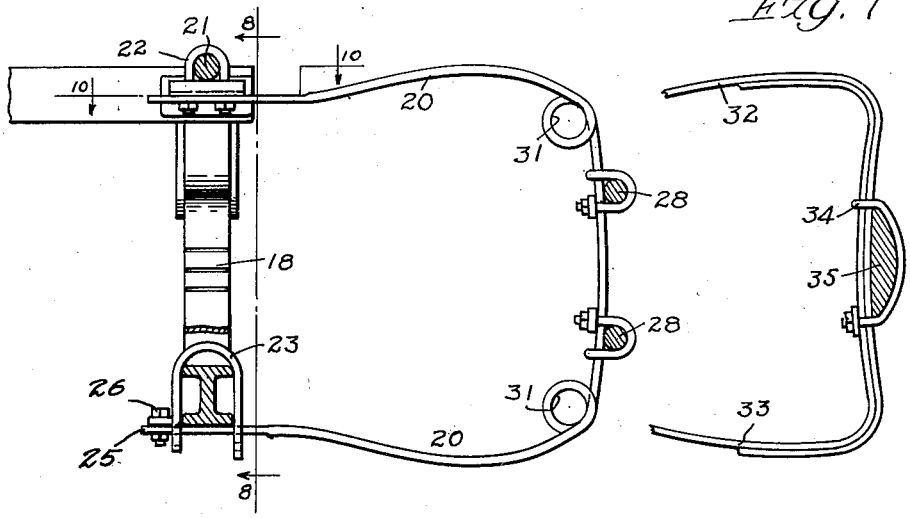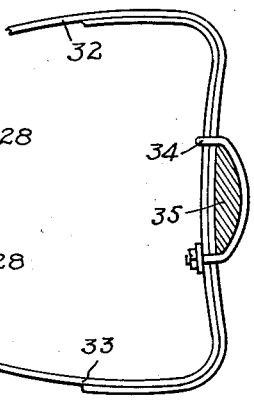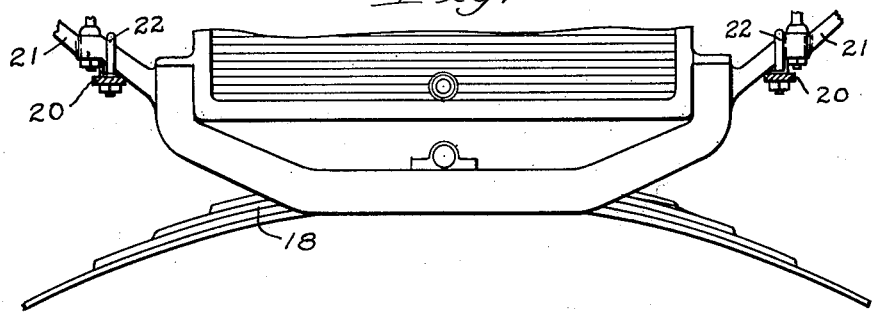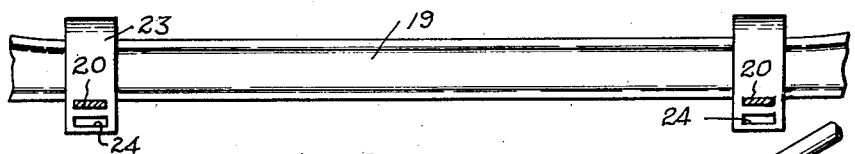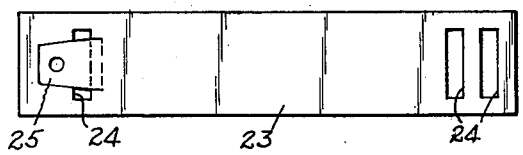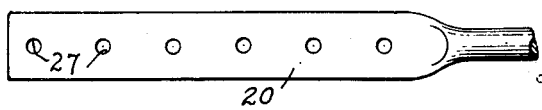

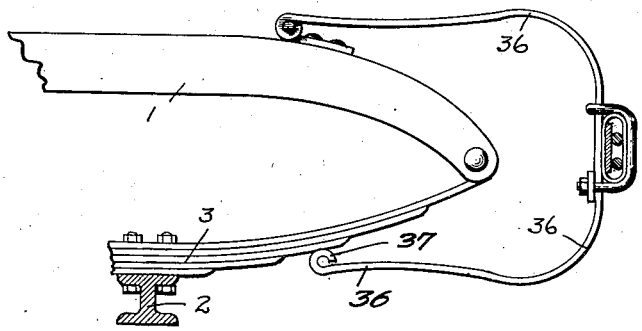
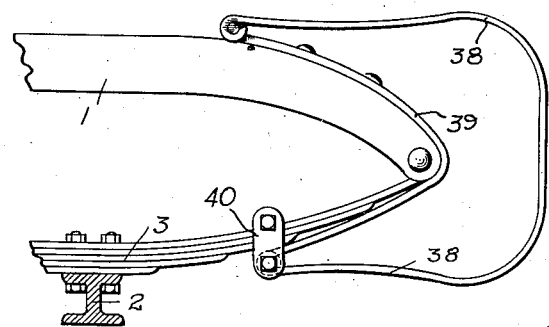
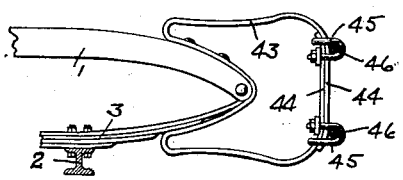
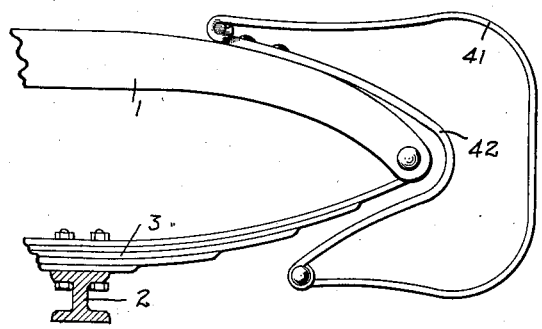
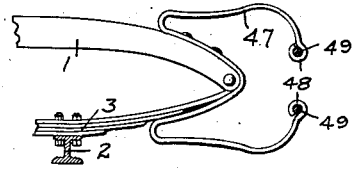
INVENTOR:
Edward A. Banschbach.

Sept. 1, 1931.     E. A. BANSCHBACH     1,821,284
BUFFER
Original Filed April 17, 1922    5 Sheets-Sheet 4

INVENTOR
Edward A. Banschbach,
By Kent W. Norwell
ATTY.

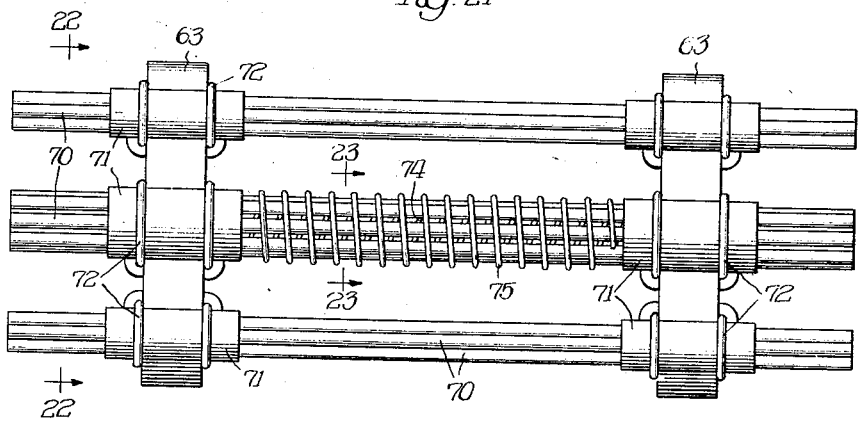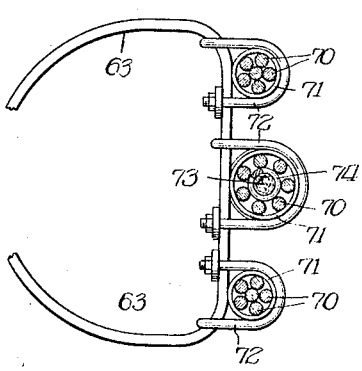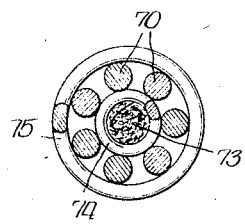

Patented Sept. 1, 1931

1,821,284

UNITED STATES PATENT OFFICE

EDWARD A. BANSCHBACH, OF MADISON, WISCONSIN

BUFFER

Original application filed April 17, 1922, Serial No. 553,462, Patent No. 1,647,766, dated November 1, 1927. Divided and this application filed November 30, 1928. Serial No. 323,589.

This is a division of my original application for buffer, Serial No. 553,462, filed April 17, 1922, Patent No. 1,647,766, November 1, 1927.

This invention relates to a vehicle buffer particularly designed and intended for use with motor vehicles, and a principal object of the invention is to provide a buffer which is attachable to different varieties of vehicle frames; to provide a buffer in which parallel loops are supported from the side frames; to utilize such loops as the basis for the attachment of a variety of buffer bars of different shapes, forms and sizes; to provide buffer bars which are covered or coated with material of different kinds; to provide improved attaching means not only for the buffer loops but also for connecting the buffer bars to the buffer loops; and in general, to produce the construction herein shown and described.

Figure 1:
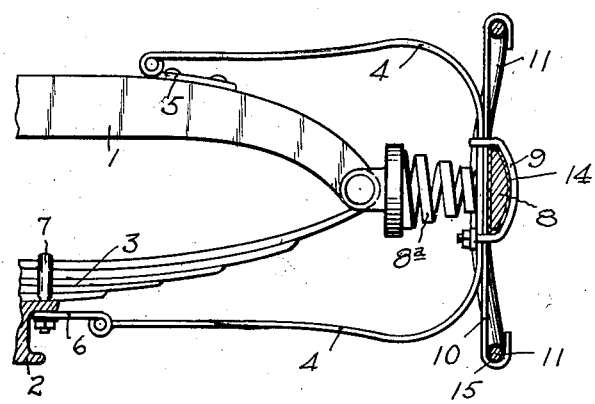
Figure 2:
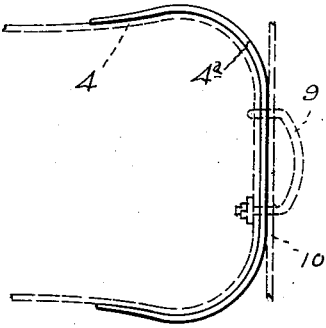
Figure 3:
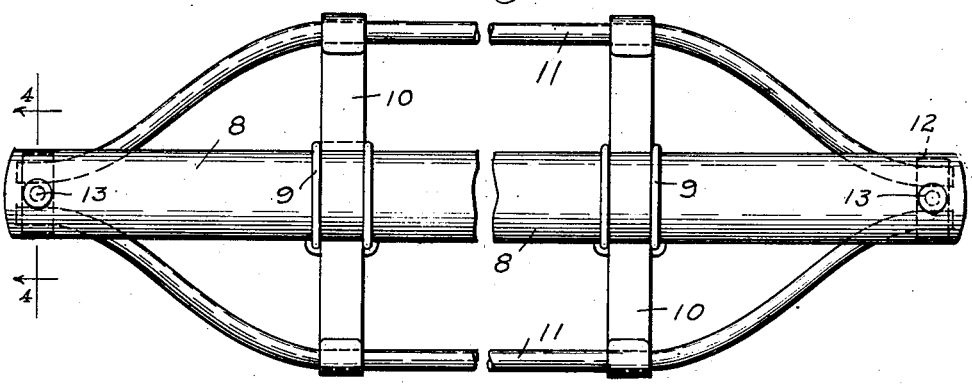
Figure 4:
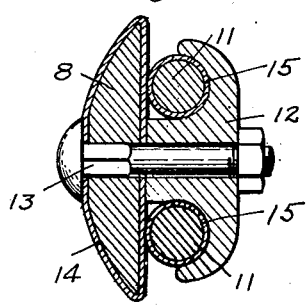
Figure 5:
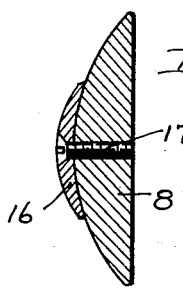
Figure 18:
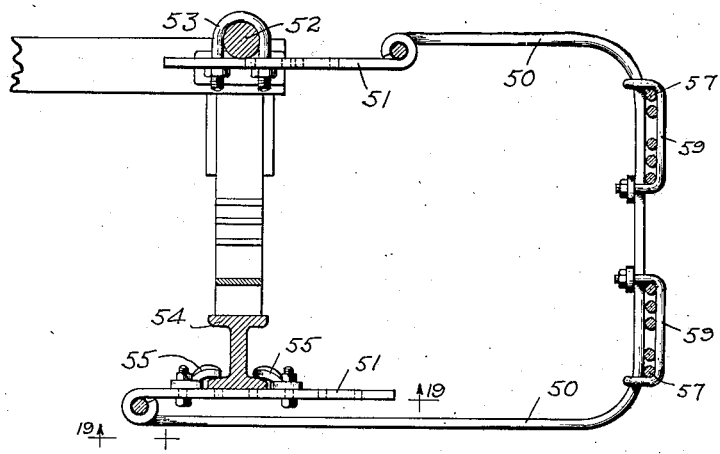
Figure 17:
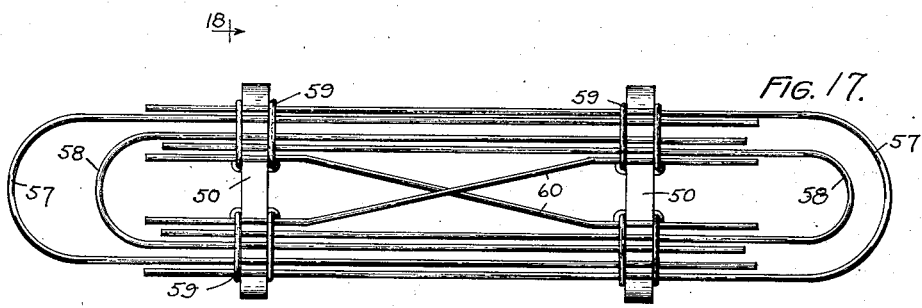
Figure 19:
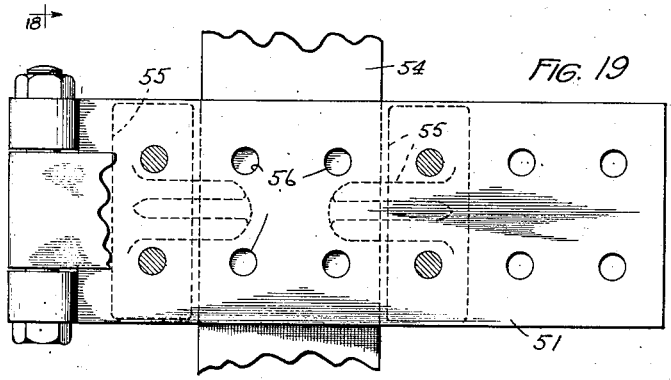
Figure 20:
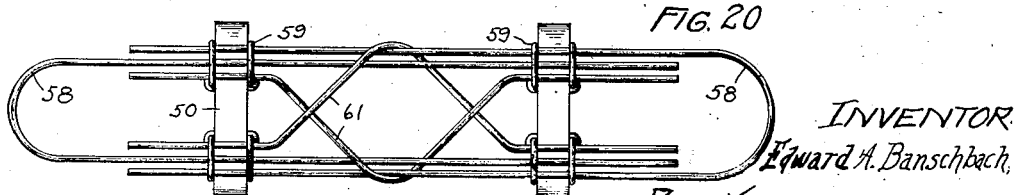

In the accompanying drawings, Figure 1 is a side elevation of a buffer attached to one end of a vehicle side frame, and its running gear; Figure 2 shows an additional spring leaf for such a buffer; Figure 3 is a front view of the buffer shown in Figure 1; Figure 4 is a section taken on the line 4—4 of Figure 3; Figure 5 shows a modified form of bumper bar; Figure 6 is a sectional side elevation of a buffer of this type applied to a vehicle having a transverse supporting spring; Figure 7 illustrates a modified form of the buffer loop; Figure 8 is a front view taken on the line 8—8 of Figure 6; Figure 9 is a view of one of the fastening strips before it is bent into its fastening shape; Figure 10 is a plan view of one end of the supporting loop shown on the line 10—10 of Figure 6; Figure 11 shows an alternative method of connecting the ends of bumper bars; Figures 12 to 16 show different varieties of bumper bar supporting loops attachable at the end of a vehicle side frame; Figure 17 is a front view of a buffer having a plurality of extensible bumper cars connected with the front thereof; Figure 18 is a sectional view taken on the line 18—18 of Figure 17; Figure 19 is a view of the fastening plate taken on the line 19—19 of Figure 18; Figure 20 is a front view of a buffer similar to Figure 17 but showing a different arrangement of the extensible bumper bars; Figure 21 illustrates a plurality of bumper bars composed of longitudinal strands, one or more of which may be wrapped to keep them together; Figure 22 is a sectional view taken on the line 22—22 of Figure 21, and Figure 23 is a section of a wrapped bumper bar taken on the line 23—23 of Figure 21.

In carrying out this invention, a pair of loops are supported at the end of a vehicle, preferably by attaching one end of the loop to the vehicle frame and the other end of the loop to the running gear frame, as shown for example in Figures 1 and 6, or by simulating this method of support, as shown by Figure 14.

As shown in Figure 1, a vehicle side frame 1 is supported from the running gear frame, represented by the axle 2 connected to the end of the side frame by the uppermost leaf of a leaf spring 3. A buffer member 4 in the form of a U-shaped resilient strip is connected on top of each side frame by means of a hinge 5, and the lower end of the member 4 is connected by a hinged member 6 to the axle 2, and by means of the same clip 7 which holds the leaf spring together. This provides a pair of spaced supporting members 4 which extend a distance in advance of the vehicle frame where they afford a support for a transverse bumper bar 8, the ends of which project beyond the members 4, but the latter extend above and below the buffer bar and to which the bar is attached by means of double U-clamps 9. Connected between the bar 8 and the members 4 by the clamps 9 are vertical supports 10 the upper and lower ends of which are bent over bumper bars 11 to hold them extended and in place. The extremities of these bars 11 are bent toward each other where they are engaged by fittings 12, one at each end of the central bar 8 and to which the fittings and the extremities of the bars 11 are connected by a fastening device 13.

The bumper bars 8 and 11 are usually made of rough cast of rolled material which is not provided with a satisfactory finish. These bars may therefore be provided with a coating 14 of material which will take a satisfactory polish, such as nickel, aluminum, or the like, or some of the bars may be provided with a resilient cover 15, such as rubber, like a rubber hose, or the like, or a strip 16 may be attached to a bar 8, as shown in Figure 5, by means of a fastening screw 17. Figures 6, 7 and 8 illustrate the invention as applied to a vehicle having a transverse spring 18 mounted above an axle 19. A buffer member 20 is supported at each side of the vehicle, the upper end being connected to a lateral supporting arm 21 by means of a U-bolt 22, and the lower end being connected to the axle 19 by a U-shaped strip 23, the ends of which are formed with perforations 24 to accommodate different sized axles through which the end of the member 20 is inserted, and with a perforated tongue 25 which is adapted to be bent at right angles to the member 23 and attached by means of a fastening bolt 26 through any one of the perforations 27 of the member 20.

Connected across the two supporting members 20 are bumper bars 28, the extremities of which are bent toward each other and connected by a loop 29 in a strap 30, as shown in Figure 11.

If desired, the support 4 may be strengthened by the addition of a bent leaf 4ª, as shown in Figure 2 in the nature of a leaf spring, this leaf making the support 4 more rigid and affording greater resistance as a buffer. Likewise, as shown by Figure 7, the loops 31 of the buffer member 20 may be omitted, and this portion of the buffer may consist of two members 32 and 33 which overlap at the front and extend backwardly therefrom at the top and bottom in the nature of a leaf spring, these two members being connected by a clamp 34 which also binds a bumper bar 35 in place.

In the constructions shown in Figures 12 to 16, the buffer members are not connected to the axle, but as shown in Figure 12, the lower end of the U-shaped buffer member 36 is hinged to a bent extremity 37 of one of the leaves of the spring 3. This construction is objectionable because the engagement of the buffer member 36 may tend to break or bend the spring leaf to which it is attached. In Figure 13 the buffer member 38 has a portion 39 which extends over the front side of the end of the frame 1 and downwardly below the extremity of a portion of the leaf spring 3 to which it is attached by side clips 40. A somewhat similar construction is shown in Figure 14 in which the buffer comprises a U-shaped member 41 and a shorter member 42 hinged at the ends thereof and substantially conforming to the connected extremities of the frame 1 and the spring 3. Instead of having the extremities of the members 41 and 42 connected by hinged joints, this portion of the buffer may be made of one piece 43, as shown by Figure 15 with the extremities 44 overlapping in front and connected by clamps 45 which also hold bumper bars 46 in place at the front of the buffers. A similar construction is shown by the one piece buffer 47 in Figure 16 in which the extremities are not overlapped at the front but are formed with loops 48 at the ends in which bars 49 are connected across the front of the frame.

A U-shaped buffer member 50 is shown in Figure 18 having parallel extremities of different lengths, and hinged at each end is an attaching plate 51 for variably connecting the buffer member to different supports. In Figure 18 the upper extremity of the buffer member is connected by means of this plate to a laterally extending bar 52 (like the bar 21 of Figure 6) by means of a U-clamp 53. The lower extremity of the member 50 is connected to the transverse axle bar 54 by turning the hinged attaching plate 51 forwardly and connecting it to the under side of the bar by means of the clamps 55 which are attached through certain of the perforations 56 in the attaching bar.

Connected across a pair of such supports 50 are a plurality of adjustable and extensible bumper bars, as shown in Figures 17 and 20. Some of these bars 57 and 58 are simply U-shaped in form and are connected to the members 50 by means of double U-clamps 59. Other bars 60 may be bent so that they cross between the other bars, as shown in Figure 17 or the bars 61 may cross and be looped over the outermost U-shaped members, as shown in Figure 20. These bars are adjustable laterally in the supports to vary the effective width of the buffer.

It is contemplated that for buffers requiring the maximum resisting power the buffer bars may be made of a plurality of smaller bars 70 either held together at the ends by means of sleeves 71 and either connected to the buffer member 63 by double U-clamps 72, or if desired, each bar may be composed of a core 73 of resilient material such as rubber or the like surrounded by wrapping 74 of wire or other material with the bars 70 surrounding the wrapped core and held in place by another wire wrapping 75. This forms a bar which is strong but yielding, and it will give the maximum resisting effect.

In all of these constructions it will be observed that the supporting basis is a pair of buffer members each substantially U-shaped, with a vertical outer portion extending some distance in advance of the end of the side frame. If desired an additional spring 8ª may be inserted between the end of the frame and the inside of the buffer member, as the member 4 in Figure 1, although the resilience of the buffer members themselves is intended to constitute sufficient resistance. The various types of bumper bars which are attached to the supports are for the purpose of enlarging the impact surface. Any or all of these bars may be surfaced or coated with a material which will take a high polish, or will resist rust, or may even be a material like rubber as explained more particularly in connection with Figure 4.

I claim:

1. In a buffer, a pair of spaced supports and a plurality of bumper bars attached at the front of the supports and extensible laterally with respect thereto.

2. In a buffer, a pair of spaced supports with a front vertical portion, a plurality of bars attachable at the front of the supports and comprising bent ends which are adjustable laterally with respect to the supports for varying the effective width of the buffer.

3. The combination with a vehicle frame, of a buffer comprising a support attachable to the extremity of the frame, a supporting spring and means extending above and below the extremity from the projecting end of the support for independent attachment to the frame and spring.

4. The combination with a vehicle frame having a projecting extremity and a supporting spring attached thereto, of a buffer comprising a support at the extremity of the frame having separate end portions extending above and below the frame rearwardly from the projecting frame extremity for separate attachment to the frame and spring, and with an outward vertical projection in advance of the frame extremity, and a bar upheld by said support and pressed outwardly by said spring.

5. The combination with a vehicle frame and running gear, of a buffer comprising a support extending in advance of each side of the frame, an attaching hinge for each end of the support and means for securing it to the frame and to the running gear, a cross bar at the front of the supports and a volute spring between each side of the frame and the bar.

6. In a buffer, a plurality of bars spaced apart and extending across the front of a vehicle to form an enlarged portion and with the ends of the bars converging and secured together, and transverse vertical members extending outside of the said bars reinforced by and connecting the bars for forming a central impact portion.

7. A vehicle buffer comprising a spiral volute spring for attachment at the end of a vehicle frame, a resilient member attached to the outer end of the spring and having means extending above and below the spring for attaching it at the end of a vehicle frame and to the running gear of a vehicle.

8. The combination with a vehicle frame, of a buffer comprising a support attachable to the extremity of the frame and extending both above and below the extremity, a cross bar carried by the support in advance of the extremity of the frame, and a volute spring attached to the support and the frame and disposed between them for additionally cushioning an impact applied to the bar.

9. The combination with a vehicle frame having protruding extremities, of a buffer comprising a support attachable adjacent the end of each of the extremities, a bar extending across and secured to the supports opposite the end of the frame, and a volute spring interposed between each extremity of the frame and the corresponding support and compressible upon impact with the bar.

10. The combination with a vehicle frame having projecting frame ends and a supporting spring, of a buffer comprising a resilient bar attached at its ends to the frame above and to the spring below and at a distance from the extremity of the frame, the support extending in advance of the frame end, and a resilient volute spring attached to the frame end and bearing against the support in advance of the frame end.

EDWARD A. BANSCHBACH.